Patented Oct. 26, 1926.

1,604,698

UNITED STATES PATENT OFFICE.

ARTHUR KIRCHHOF, OF MEERANE, GERMANY.

PROCESS OF TREATING ALUMINUM TO FACILITATE THE WELDING AND SOLDERING THEREOF.

No Drawing. Application filed October 8, 1925, Serial No. 61,273, and in Germany March 7, 1924.

According to this invention powdered calcium carbonate which may for example be in the form of powdered sea shells, is added to, and mixed with, molten aluminum, the purpose of the treatment being to render the metal capable of being readily welded or soldered. The effect of the calcium carbonate may be attributed to elimination of clay and other impurities from the metal.

After melting the aluminum the scum is removed, and the powdered calcium carbonate is then added, and stirred. The calcium carbonate should not be too finely powdered. The nature of the physical or chemical action produced by the calcium carbonate is still obscure, except in regard to its ultimate effect, which is that a large proportion of the impurities not separated by the preliminary skimming of the molten metal are separated in the form of scum by the action of the carbonate. The result may be due, or in part due, to the reduction of oxides by organic matter, or by decomposition products of organic matter, contained in the carbonate, but I have so far not obtained any definite evidence that this is the case.

Aluminum thus treated can be cast, rolled and drawn, for example for making tubes and wire, and also furnishes a very effective solder for aluminum, even if the aluminum from which the articles to be soldered are made has not been treated by the process. A welding lamp is generally required for the soldering operation, the heat of ordinary soldering lamps being insufficient.

By autogenous welding joints can be made, whose strength exceeds that of unwelded portions of the articles.

What I claim as my invention and desire to secure by Letters Patent of the United States is:—

1. The process of treating aluminum for the purpose set forth, consisting in melting the aluminum and mixing powdered calcium carbonate therewith, and removing the scum from the molten aluminum.

2. The process of treating aluminum for the purpose set forth, consisting in melting the aluminum and mixing powdered calcium carbonate therewith, the calcium carbonate consisting of powdered sea-shells.

In witness whereof I have signed this specification.

ARTHUR KIRCHHOF.